Sept. 23, 1958          N. F. RILEY          2,853,411
ELASTIC PAPER BACKED CUSHIONING MATERIAL
Filed March 21, 1955
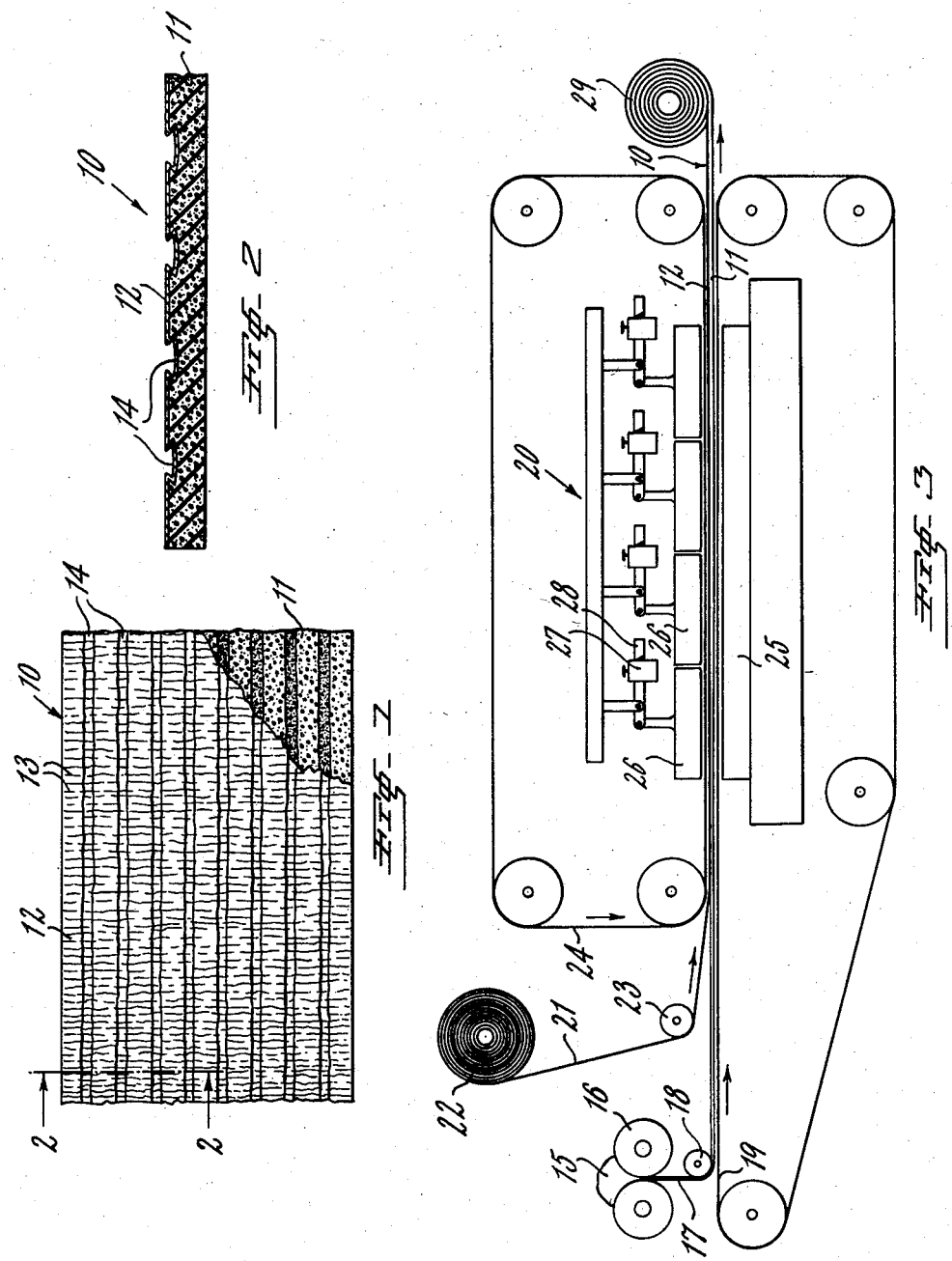
INVENTOR.
NELSON F. RILEY
BY
ATTORNEY

United States Patent Office 2,853,411
Patented Sept. 23, 1958

2,853,411

ELASTIC PAPER BACKED CUSHIONING MATERIAL

Nelson F. Riley, Naugatuck, Conn., assignor to United States Rubber Company, New York, N. Y., a corporation of New Jersey Application March 21, 1955, Serial No. 495,533

3 Claims. (Cl. 154—49)

This invention relates to an improved flexible elastic cushioning material having a lamina of stretchable water repellant paper bonded to a lamina of elastic sponge rubber.

The improved cushioning material is particularly useful as an under-cushion for rugs which is generally known as rug underlay. Where the underlay is not adhered to the rug, it is desirable to reinforce the sponge rubber lamina of the underlay to prevent it from being torn while being handled, transported, and laid. Heretofore, the sponge rubber lamina was reinforced with an open weave textile fabric, which was bonded to the rubber. Such fabric is relatively expensive and increased the cost of the underlay. The fabric also unduly restricted the stretch of the underlay in the direction of the yarns and provided an excessive amount of stretch in the bias direction of the yarns. Greater uniformity of stretch in all directions is desirable in order to relieve the strain on the adhesive bond between the fabric and the rubber lamina when excessive stretch occurs, and to distribute the stresses in the fabric and rubber laminae more uniformly when the underlay is pulled and placed in tension as when it is being laid.

It is the object of this invention to not only provide a less expensive and more efficient reinforcement for sponge rubber lamina, but to also form a water barrier between the sponge rubber lamina and the rug and thereby protect the sponge material from the deleterious effect of water which may be spilled on the rug or used with detergents for cleaning the rug.

In accordance with this invention the sponge rubber cushioning lamina of the rug underlay is reinforced by lamina of universally stretchable water repellant paper, and when the underlay is laid, the paper is placed adjacent the rug to form a water barrier between the sponge rubber lamina and the rug. The term "universally stretchable" is used herein to designate the capacity to be stretched a substantial amount in all directions within the plane of the paper without rupturing, and the term sponge rubber includes cellular rubber either natural or synthetic, or rubber-like materials.

This invention, its objects and advantages are further described in reference to the accompanying drawings, in which:

Fig. 1 is a plan view of a strip of rug underlay embodying this invention;

Fig. 2 is a cross section of the underlay shown in Fig. 1, taken on line 2—2 therein; and Fig. 3 is a schematic side elevational view of an apparatus illustrating the method of making the underlay.

The improved elastic cushioning material 10 embodying this invention comprises a lamina 11 of sponge rubber, which is intimately bonded to a lamina 12 of universally stretchable water repellant paper. The universal stretch may be produced in the paper by forming small wrinkles 13 therein transversely of the strip and then forming corrugations 14 in the strip longitudinally thereof. The wrinkles may be formed in the paper by the conventional creping process, and the corrugations may be formed by running the paper longitudinally between a grooved roll and rollers fitting into the grooves after the paper has been creped.

The paper lamina 12 is then rendered water repellant by impregnating it with a water repellant wax which is compatible with the sponge rubber lamina 11, and which is insoluble in water. For example, paraffin, microcrystolene and carnauba waxes may be used as impregnating materials. Such materials are compatible with natural and synthetic rubbers in that they are absorbed into the rubber and do not prevent the paper from being bonded to the rubber by the natural tack of the rubber while it is being expanded and vulcanized. It has been found that a kraft paper having an initial thickness of .050" and crimped or creped to give a thickness of 0.125" and then impregnated with 12% to 15% by weight of paraffin wax gives very good results.

The extensibility of the paper in all directions should be not less than 5% and the maximum obtainable extensibility of 30% is satisfactory. The tensile strength of the paper should be high. A paper having a tensile strength of from 10 to 14 pounds per inch in width extending either transversely or lengthwise of the strip of paper is sufficiently strong for the rug underlay.

Where either natural or sponge rubber is used in the sponge rubber lamina 11, it may be combined with the paper lamina 12, as shown in Fig. 3, by calendering a vulcanizable sponge rubber mix 15 containing a blowing agent on a calendar 16 into a calendered sheet 17, which forms the lamina 11 of the underlay 10. The calendered sheet of rubber 17 passes downwardly under a guide roll 18 onto a belt 19, and is carried thereby through a curing press 20. Before the sheet 18 of the sponge rubber mix passes into the press 20, a strip of stretchable paraffin impregnated paper 21, which forms the paper lamina 12 of the rug underlay 10, is led from a roll 22 of the paper downwardly under a guide roll 23 onto the top of the sponge rubber mix sheet 17. The paper 21 and the sponge rubber sheet 17 pass between an upper belt 24 and the lower belt 19 into the press 20, which comprises a lower heating platen 25 and a series of upper heating platens 26 between which the belts 19 and 24 pass. The heating platens 25 and 26 transmit the quantity of heat to rubber mix 17 required to blow and expand the mix as it passes through the press. As the rubber 17 is heated it becomes soft and the paper 21 is adhered thereto by the light pressure exerted thereon by the upper platens 26 which forces the paper into contact with rubber mix 17 as the latter is expanded and cured by the heat. The press 20 is described in more detail in United States Patent Number 2,096,338, granted October 19, 1937, to Chester J. Randall. The pressure exerted by the upper platens 26 may be adjusted as shown schematically by the weights 27 in Fig. 3, which are slidable along the levers 28, on which the platens 26 are suspended. In practice the platens are adjusted to exert a pressure of 0.10 p. s. i. on the paper 21 and rubber 17.

The melting point of the impregnating wax in the paper 21 must be less than the vulcanizing temperature of the rubber 17 so that the wax adjacent to the rubber will melt and become absorbed into the rubber when the two materials are heated and softened in the press 20, and thereby permit the rubber to adhere to the paper when expanded in contact therewith. The specific type of paraffin wax used herein has a melting point between 132° F. and 135° F. The adhesion of the rubber to the paper, and the expansion and cure of the rubber is completed as the combined materials are discharged from the press 20 in the form of the rug underlay 10, which is then rolled up on a roll 29.

The preferred method of manufacturing the underlay 10 has been described herein, but it will be understood that other methods and expandable plastic materials may be used to make such underlay, and it is intended to cover such plastic materials used in the rug underlay which come within the scope of the appended claims.

Having thus described my invention, what I claim and desire to protect by Letters Patent is:

1. A laminated elastic cushioning sheet material comprising a reinforcing lamina of universally stretchable paper which is crinkled in one direction and corrugated in the direction transverse thereto, said paper having not less than 5% of stretch in all directions within the plane of the paper and being impregnated with a wax compatible with rubber, a cushioning lamina of elastic sponge rubber intimately bonded to said lamina of paper, and said paper being adapted to limit the extensibility of said lamina of rubber.

2. A laminated elastic cushioning sheet material comprising a universally stretchable lamina of kraft paper which is crinkled in one direction and corrugated in the direction transverse thereto, said paper containing a water repellant wax which is compatible with rubber, and a lamina of sponge rubber intimately bonded to said paper.

3. A laminated elastic cushioning sheet material comprising a reinforcing lamina of universally stretchable kraft paper which is crinkled in one direction and corrugated in the direction transverse to said crinkles to provide not less than 5% stretch in all directions, said paper having a tensile strength of not less than 10 pounds per inch of width in any direction and containing about 12% of paraffin wax, and a lamina of sponge rubber intimately bonded to said lamina of paper.

References Cited in the file of this patent

UNITED STATES PATENTS

| | | |
|---|---|---|
| 1,905,008 | Slagle | Aug. 25, 1933 |
| 1,905,769 | Vrooman | Apr. 25, 1933 |
| 1,924,635 | Buffington | Aug. 29, 1933 |
| 2,140,026 | Murphy et al. | Dec. 13, 1938 |
| 2,285,650 | Faris et al. | June 9, 1942 |
| 2,474,398 | Heritage | June 28, 1949 |
| 2,628,654 | Alderfer | Feb. 17, 1953 |
| 2,686,747 | Wurtz et al. | Aug. 17, 1954 |
| 2,768,091 | Cubberley | Oct. 23, 1956 |

FOREIGN PATENTS

| | | |
|---|---|---|
| 358,556 | Great Britain | Oct. 8, 1931 |
| 494,301 | Great Britain | Oct. 20, 1938 |